United States Patent
Joyce et al.

(10) Patent No.: US 11,128,918 B2
(45) Date of Patent: Sep. 21, 2021

(54) METHODS, SYSTEMS, AND MEDIA FOR AGGREGATING AND PRESENTING CONTENT RELEVANT TO A PARTICULAR VIDEO GAME

(71) Applicant: Google LLC, Mountain View, CA (US)

(72) Inventors: Alan Joyce, Mountain View, CA (US); Marshall Bock, San Francisco, CA (US); Jonathan Terleski, Mountain View, CA (US); Frank Petterson, Los Altos Hills, CA (US); Jason Robert Sao Bento, Toronto (CA); Kristofer Chiao, Hillsborough, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/179,575

(22) Filed: Jun. 10, 2016

(65) Prior Publication Data

US 2016/0366483 A1 Dec. 15, 2016

Related U.S. Application Data

(60) Provisional application No. 62/174,482, filed on Jun. 11, 2015.

(51) Int. Cl.
*H04N 21/85* (2011.01)
*H04N 21/61* (2011.01)
(Continued)

(52) U.S. Cl.
CPC ....... *H04N 21/47202* (2013.01); *A63F 13/79* (2014.09); *A63F 13/85* (2014.09);
(Continued)

(58) Field of Classification Search
CPC ............................ H04N 21/325; H04N 21/235
(Continued)

(56) References Cited

U.S. PATENT DOCUMENTS 7,988,560 B1\* 8/2011 Heller ...................... A63F 9/24
463/40
9,486,698 B2\* 11/2016 Chung ................ H04N 21/812
(Continued)

FOREIGN PATENT DOCUMENTS

CN 102884538 1/2013
CN 104144181 11/2014

OTHER PUBLICATIONS

International Search Report and Written Opinion dated Aug. 12, 2016 in International Patent Application No. PCT/US2016/037031.
(Continued)

*Primary Examiner* — Mushfikh I Alam
(74) *Attorney, Agent, or Firm* — Byrne Poh LLP

(57) ABSTRACT

Methods, systems, and media for aggregating and presenting content relevant to a particular video game. In some embodiments, the method comprises: identifying videos related to a video game; selecting videos relevant to each of a plurality of categories; selecting videos based on popularity; receiving a request to present a user interface related to the video game; determining user subscription information for a user associated with the request; selecting videos based on user subscription information; causing the user interface to be presented including representations of: videos relevant to a first category in a first portion, videos selected based on popularity in a second portion, and videos selected based on the user subscription information in a third portion; receiving a request to present a video selected via the user interface; and causing the user device to present the requested video.

21 Claims, 8 Drawing Sheets

US 11,128,918 B2

Page 2

(51) Int. Cl.
  H04N 21/235 (2011.01)
  H04N 21/472 (2011.01)
  H04N 21/45 (2011.01)
  H04N 21/462 (2011.01)
  H04N 21/41 (2011.01)
  A63F 13/85 (2014.01)
  A63F 13/79 (2014.01)
  G06F 16/735 (2019.01)
  G06F 16/74 (2019.01)
  G06F 16/78 (2019.01)
  G06F 16/738 (2019.01)

(52) U.S. Cl.
  CPC .......... *G06F 16/735* (2019.01); *G06F 16/738* (2019.01); *G06F 16/743* (2019.01); *G06F 16/7867* (2019.01); *H04N 21/4126* (2013.01); *H04N 21/4532* (2013.01); *H04N 21/4622* (2013.01); *H04N 21/6125* (2013.01)

(58) Field of Classification Search
  USPC .................................................. 725/74–104
  See application file for complete search history.

(56) References Cited

U.S. PATENT DOCUMENTS

| | | | | |
|---|---|---|---|---|
| 2004/0123320 | A1* | 6/2004 | Daily | H04N 5/44543 725/61 |
| 2006/0287105 | A1* | 12/2006 | Willis | A63F 13/12 463/42 |
| 2007/0101375 | A1* | 5/2007 | Haberman | G06F 17/30817 725/86 |
| 2008/0039967 | A1* | 2/2008 | Sherwood | H04L 65/4015 700/94 |
| 2008/0301260 | A1* | 12/2008 | Goldeen | H04N 21/2225 709/219 |
| 2009/0118020 | A1* | 5/2009 | Koivisto | A63F 13/12 463/42 |
| 2011/0312424 | A1* | 12/2011 | Burckart | H04N 21/4788 463/42 |
| 2012/0260290 | A1* | 10/2012 | Friedlander | H04N 21/4314 725/44 |
| 2012/0309511 | A1* | 12/2012 | Chung | H04N 21/274 463/30 |
| 2013/0198770 | A1* | 8/2013 | Xiong | H04N 21/812 725/25 |
| 2013/0260896 | A1* | 10/2013 | Miura | A63F 13/12 463/42 |
| 2014/0179425 | A1* | 6/2014 | Perry | A63F 13/12 463/31 |
| 2014/0221087 | A1* | 8/2014 | Huang | G06F 9/45533 463/31 |
| 2014/0323213 | A1* | 10/2014 | Wakeford | A63F 13/60 463/31 |
| 2015/0007231 | A1* | 1/2015 | Mule | H04N 21/4828 725/41 |
| 2015/0020126 | A1* | 1/2015 | Kegel | G06F 17/30029 725/87 |
| 2015/0024839 | A1* | 1/2015 | Zahn | H04N 21/4781 463/31 |
| 2015/0141140 | A1* | 5/2015 | Lampe | H04N 21/8549 463/31 |
| 2015/0296250 | A1* | 10/2015 | Casper | H04N 21/4316 725/34 |
| 2015/0312629 | A1* | 10/2015 | Bugajski | H04N 21/4312 725/59 |
| 2015/0379407 | A1* | 12/2015 | Woon | A63F 13/35 463/42 |
| 2016/0030841 | A1* | 2/2016 | Perlman | A63F 13/355 463/33 |
| 2016/0127795 | A1* | 5/2016 | Mason | H04N 21/8545 725/53 |
| 2016/0156983 | A1* | 6/2016 | Vong | H04N 21/42212 725/47 |
| 2016/0317933 | A1* | 11/2016 | Shoshan | A63F 13/422 |
| 2017/0001112 | A1* | 1/2017 | Gilmore | A63F 13/30 |
| 2017/0001122 | A1* | 1/2017 | Leung | A63F 13/86 |
| 2017/0003740 | A1* | 1/2017 | Verfaillie | G06F 3/013 |
| 2017/0006074 | A1* | 1/2017 | Oates, III | H04L 65/4069 |
| 2017/0155939 | A1* | 6/2017 | Prasad | H04N 21/252 |
| 2017/0189809 | A1* | 7/2017 | Posin | A63F 13/35 |
| 2017/0199943 | A1* | 7/2017 | Steelberg | G06F 16/9038 |
| 2017/0246544 | A1* | 8/2017 | Agarwal | A63F 13/86 |
| 2017/0270128 | A1* | 9/2017 | Smith | A63F 13/25 |
| 2018/0117462 | A1* | 5/2018 | Miura | A63F 13/2145 |
| 2018/0176655 | A1* | 6/2018 | Whitlock | H04N 21/4312 |

OTHER PUBLICATIONS

Waitelonis et al., "Towards Exploratory Video Search Using Linked Data", in Multimedia Tools and Applications, Jan. 28, 2011, pp. 645-672.

Waitelonis et al., "Use What You Have: Yovisto Video Search Engine Takes a Semantic Turn", in Semantic Multimedia, Dec. 1, 2010, pp. 173-185.

International Preliminary Report on Patentability dated Dec. 12, 2017 in International Patent Application No. PCT/US2016/037031.

Examination Report dated Jun. 3, 2019 in EP Patent Application No. 16733781.5.

Summons to Attend Oral Proceedings dated Apr. 29, 2020 in European Patent Application No. 16733781.5.

Decision to Refuse a European Patent Application dated May 3, 2021 in EP Patent Application No. 16733781.5.

Examination Report dated Jul. 8, 2021 in GB Patent Application No. 1713667.2.

Office Action dated Jul. 5, 2021 in CN Patent Application No. 201680019886.1.

* cited by examiner

300

302 — RECEIVE AND/OR SELECT A VIDEO TO BE CLASSIFIED BASED ON RELEVANCE TO ONE OR MORE CATEGORIES, KEYWORDS AND/OR VIDEO GAMES

304 — IDENTIFY INFORMATION TO BE USED IN ASSOCIATING THE VIDEO WITH ONE OR MORE CATEGORIES, KEYWORDS AND/OR VIDEO GAMES

306 — BASED ON THE IDENTIFIED INFORMATION, DETERMINE A LIKELIHOOD THAT THE VIDEO IS RELEVANT TO ONE OR MORE CATEGORIES, KEYWORDS AND/OR VIDEO GAMES

308 — ASSOCIATE THE VIDEO WITH CATEGORIES, KEYWORDS AND/OR A PARTICULAR VIDEO GAME FOR WHICH THE LIKELIHOOD IS OVER A THRESHOLD LIKELIHOOD

310 — GENERATE INSTRUCTIONS FOR CAUSING A USER DEVICE TO PRESENT THE USER INTERFACE FOR THE PARTICULAR VIDEO GAME INCLUDING AT LEAST A PORTION OF VIDEOS ASSOCIATED WITH THE VIDEO GAME

FIG. 3

METHODS, SYSTEMS, AND MEDIA FOR AGGREGATING AND PRESENTING CONTENT RELEVANT TO A PARTICULAR VIDEO GAME

CROSS-REFERENCE TO RELATED APPLICATIONS

This application claims the benefit of U.S. Provisional Patent Application No. 62/174,482, filed Jun. 11, 2015, which is hereby incorporated by reference herein in its entirety.

TECHNICAL FIELD

The disclosed subject matter relates to methods, systems, and media for aggregating and presenting content relevant to a particular video game.

BACKGROUND

The amount of content accessible to consumers interested in a particular subject has never greater. However, in order to find relevant content about a particular subject, the consumer typically performs a search, and then parses through the search results to find the content that they are interested in. If the consumer is interested in different types of content related to the same product, they often perform different searches, and either navigate away from their previous search results, or open a new user interface, which can make it difficult to look back at the previous results that may have been related to a different type of content.

Accordingly, it is desirable to provide methods, systems, and media for aggregating and presenting content relevant to a particular video game.

SUMMARY

In accordance with various embodiments of the disclosed subject matter, methods, systems, and media for aggregating and presenting content relevant to a particular video game are provided.

In accordance with some embodiments of the disclosed subject matter, a method for presenting videos related to a common subject is provided, the method comprising: identifying, using a hardware processor, from a corpus of videos related to a variety of subjects that are available from a video sharing platform, a plurality of videos related to a video game; selecting, for each of a plurality of categories, from the plurality of videos one or more videos relevant to that category; selecting from the plurality of videos one or more videos based on popularity of each of the plurality of videos; receiving a request from a user device to present a user interface including representations of videos related to the video game; determining user subscription information for a user associated with the user device, wherein the user subscription information indicates that the user has subscribed to content from other users of the video sharing platform and which of the other users the user has subscribed to; in response to receiving the request to present the user interface, selecting one or more of the plurality of videos based on the user subscription information; causing the user device to present the user interface having a plurality of portions including at least a first portion that includes representations of videos relevant to a first of the plurality of categories, a second portion that includes representations of videos selected based on popularity, and a third portion that includes representations of videos selected based on the user subscription information; receiving a request to present a video selected via the user interface; and causing the user device to present the requested video.

In accordance with some embodiments of the disclosed subject matter, a system for presenting videos related to a common subject is provided, the system comprising: a hardware processor that is programmed to: identify, from a corpus of videos related to a variety of subjects that are available from a video sharing platform, a plurality of videos related to a video game; select, for each of a plurality of categories, from the plurality of videos one or more videos relevant to that category; select from the plurality of videos one or more videos based on popularity of each of the plurality of videos; receive a request from a user device to present a user interface including representations of videos related to the video game; determine user subscription information for a user associated with the user device, wherein the user subscription information indicates that the user has subscribed to content from other users of the video sharing platform and which of the other users the user has subscribed to; in response to receiving the request to present the user interface, select one or more of the plurality of videos based on the user subscription information; cause the user device to present the user interface having a plurality of portions including at least a first portion that includes representations of videos relevant to a first of the plurality of categories, a second portion that includes representations of videos selected based on popularity, and a third portion that includes representations of videos selected based on the user subscription information; receive a request to present a video selected via the user interface; and cause the user device to present the requested video.

In accordance with some embodiments of the disclosed subject matter, a non-transitory computer-readable medium containing computer executable instructions that, when executed by a processor, cause the processor to perform a method for presenting videos related to a common subject is provided, the method comprising: identifying, from a corpus of videos related to a variety of subjects that are available from a video sharing platform, a plurality of videos related to a video game; selecting, for each of a plurality of categories, from the plurality of videos one or more videos relevant to that category; selecting from the plurality of videos one or more videos based on popularity of each of the plurality of videos; receiving a request from a user device to present a user interface including representations of videos related to the video game; determining user subscription information for a user associated with the user device, wherein the user subscription information indicates that the user has subscribed to content from other users of the video sharing platform and which of the other users the user has subscribed to; in response to receiving the request to present the user interface, selecting one or more of the plurality of videos based on the user subscription information; causing the user device to present the user interface having a plurality of portions including at least a first portion that includes representations of videos relevant to a first of the plurality of categories, a second portion that includes representations of videos selected based on popularity, and a third portion that includes representations of videos selected based on the user subscription information; receiving a request to present a video selected via the user interface; and causing the user device to present the requested video.

In accordance with some embodiments of the disclosed subject matter, a system for presenting videos related to a common subject is provided, the system comprising: means for identifying, from a corpus of videos related to a variety of subjects that are available from a video sharing platform, a plurality of videos related to a video game; means for selecting, for each of a plurality of categories, from the plurality of videos one or more videos relevant to that category; means for selecting from the plurality of videos one or more videos based on popularity of each of the plurality of videos; means for receiving a request from a user device to present a user interface including representations of videos related to the video game; means for determining user subscription information for a user associated with the user device, wherein the user subscription information indicates that the user has subscribed to content from other users of the video sharing platform and which of the other users the user has subscribed to; means, response to the means for receiving the request to present the user interface, for selecting one or more of the plurality of videos based on the user subscription information; means for causing the user device to present the user interface having a plurality of portions including at least a first portion that includes representations of videos relevant to a first of the plurality of categories, a second portion that includes representations of videos selected based on popularity, and a third portion that includes representations of videos selected based on the user subscription information; means for receiving a request to present a video selected via the user interface; and means for causing the user device to present the requested video.

In some embodiments, the plurality of categories includes at least one of the following categories: videos that include a review of the video game; videos uploaded by a publisher of the game; and videos that are currently being live streamed.

In some embodiments, the interface includes metadata related to the video game including a title of the game and one or more images related to the video game.

In some embodiments, the user interface includes a fourth portion that includes videos relevant to a second of the plurality of categories, and the user interface includes a plurality of user interface elements each corresponding to one of the plurality of portions such that selection of the user interface element corresponding to a particular portion causes representations of videos included in that portion to be presented via the user interface.

In some embodiments, the user interface includes a fifth portion that includes representations of at least one video from each of the first through fourth portions.

In some embodiments, the plurality of user interface elements are presented as tabs over an area of the user interface in which representations of videos from a selected tab are presented.

In some embodiments, each video presented in the first portion that is associated with a category of the plurality of categories is presented in association with an icon identifying the category associated with that video.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 3 shows an example of a process for aggregating and presenting content relevant to a particular video game in accordance with some embodiments of the disclosed subject matter.

DETAILED DESCRIPTION

Figure 1:
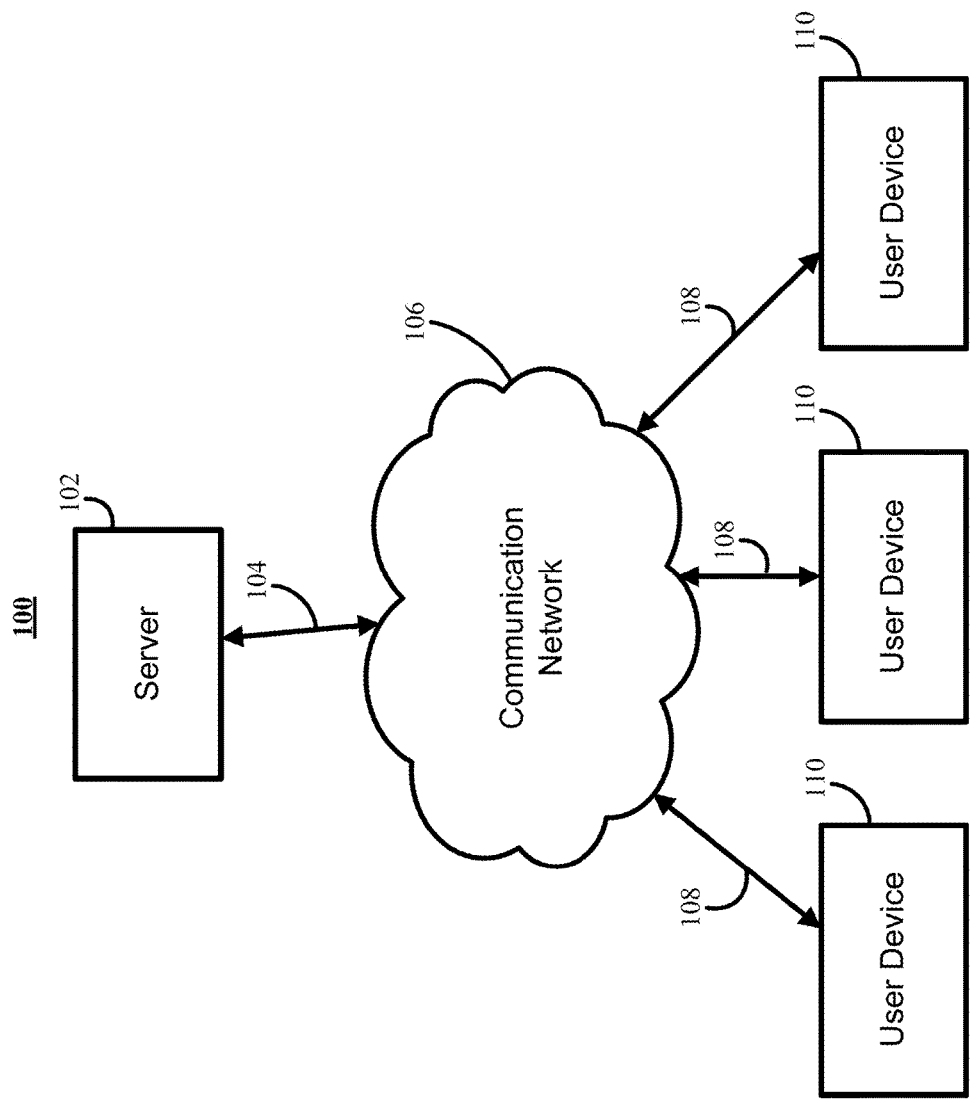
FIG. 1 shows an example of a generalized schematic diagram of a system on which the mechanisms for aggregating and presenting content relevant to a particular video game as described herein can be implemented in accordance with some embodiments.

In accordance with various embodiments, mechanisms (which can include methods, systems, and/or media) for aggregating and presenting content relevant to a particular video game are provided.

In some embodiments, the mechanisms described herein can associate videos that are available via a video hosting platform with one or more categories, keywords and/or video games. For example, when a video is uploaded, the mechanisms described herein can determine what type of video it is, such as a review of a video game, video of a video game being played, a music video, a live stream of a video being played, a promotional video from a publisher of a video game, a funny video about the video game, etc. As another example, the mechanisms described herein can determine keywords that are to be associated with the video, which can be used when searching for the video. As yet another example, the mechanisms described herein can determine which video game or video games (if any) the video is related to. In a more particular example, when a user uploads a video and inputs various data about the video, such as a title, description, and a video game to which the video is related, the mechanisms described herein can use the user inputted data, as well as any other suitable information (such as information extracted from the content of the video) to determine that the video is a review of the video game "Cones of Dunshire" released in 2013, and can associate various other categories and/or keywords with the video.

In some embodiments, the mechanisms described herein can generate user interfaces for each video game that is associated with one or more videos such that if a user is interested in videos related to that video game, the user can request the user interface for that video game and browse through various videos that the mechanisms described herein (and/or any other suitable mechanisms) have identified as being related to that particular game. In a more particular example, the mechanisms described herein can cause a user interface for the video game "Cones of Dunshire" to include the newly uploaded review video when the user interface is presented to a user.

In some embodiments, the user interface for a particular game can include various information about the game, artwork related to the game, and various portions with different types of videos that are all related to that game. For example, the user interface can include a portion for videos about that game that are currently popular. As another example, the user interface can include a portion for videos that include reviews of the video game. As yet another example, the user interface can include a portion for videos that include video of the game being played. As still another example, the user interface can include a portion for videos that have been uploaded by another user that the user being presented with the user interface subscribes to. In a more particular example, the mechanisms described herein can cause the video review for the video game "Cones of Dunshire" to be presented in a portion of the user interface devoted to reviews.

FIG. 1 shows an example 100 of a generalized schematic diagram of a system on which the mechanisms for aggregating and presenting content relevant to a particular video game as described herein can be implemented in accordance with some embodiments. As illustrated, system 100 can include one or more user devices 110. User devices 110 can be local to each other or remote from each other. User devices 110 can be connected by one or more communications links 108 to a communication network 106 that can be linked to a server 102 via a communications link 104.

System 100 can include one or more servers 102. Server 102 can be any suitable server or servers for providing access to the mechanisms described herein for aggregating and presenting content relevant to a particular video game, such as a hardware processor, a computer, a data processing device, or any suitable combination of such devices. For example, the mechanisms for aggregating and presenting content relevant to a particular video game can be distributed into multiple backend components and multiple frontend components and/or user interfaces. In a more particular example, backend components, such as: mechanisms for determining a likelihood that a video is relevant to one or more categories, keywords and/or video games; mechanisms for associating a video with one or more categories, keywords and/or video games; mechanisms for selecting videos to be represented in a user interface associated with a particular video game; mechanisms for receiving requests for media content; etc., can be performed on one or more servers 102. In another more particular example, frontend components, such as presentation of a user interface, initiating requests for a user interface associated with a particular video game, presenting the user interface, initiating requests for media content, etc., can be performed on one or more user devices 110.

In some embodiments, each of user devices 110 and server 102 can be any of a general purpose device such as a computer or a special purpose device such as a client, a server, etc. Any of these general or special purpose devices can include any suitable components such as a hardware processor (which can be a microprocessor, a digital signal processor, a controller, etc.), memory, communication interfaces, display controllers, input devices, etc. For example, user device 110 can be implemented as a smartphone, a tablet computer, a mobile telephone, a wearable computer, a personal computer, a laptop computer, a digital media receiver, a set-top box, a smart television, a home entertainment system, a game console, any other suitable computing device, or any suitable combination thereof.

Communications network 106 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), an intranet, etc. Each of communications links 104 and 108 can be any communications links suitable for communicating data among user devices 110, and servers 102, such as network links, dial-up links, wireless links, hard-wired links, any other suitable communications links, or any suitable combination of such links. Note that, in some embodiments, multiple servers 102 can be used to provide access to different mechanisms associated with the mechanisms described herein for aggregating and presenting content relevant to a particular video game. For example, system 100 can include a media content discovery server 102 that facilitates discovery of media content available from a media content platform using the mechanisms described herein, a media content delivery server 102 that responds to requests for the media content by causing the video content to be presented by a user device, a user interface generation server 102 that creates instructions for presenting a user interface associated with a particular video game, and/or any other suitable servers for performing any suitable functions of the mechanisms described herein.

Figure 2:
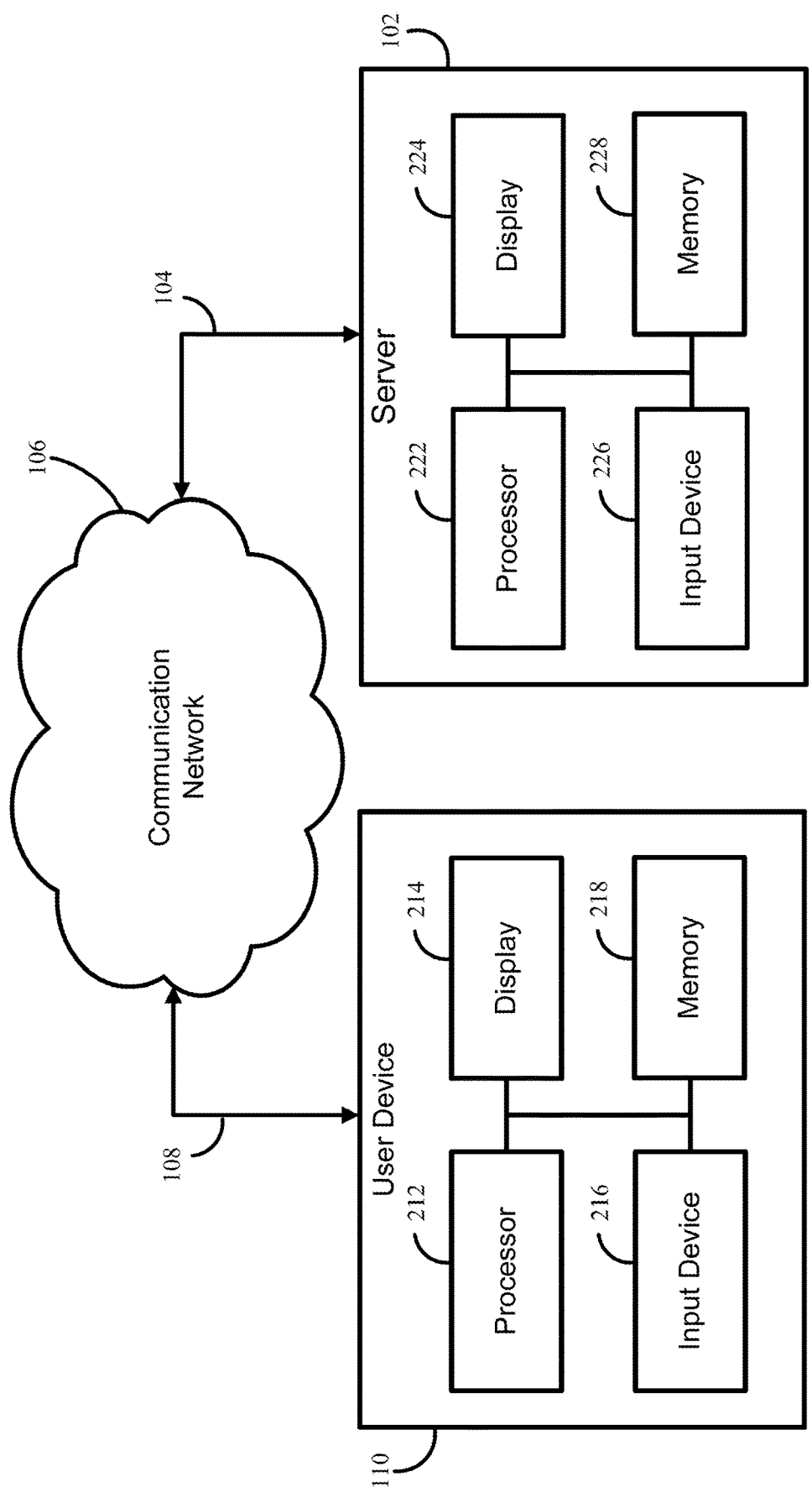
FIG. 2 shows an example of hardware that can be used to implement one or more of the user devices and servers depicted in FIG. 1 in accordance with some embodiments of the disclosed subject matter.

FIG. 2 shows an example 200 of hardware that can be used to implement one or more of user devices 110 and servers 102 depicted in FIG. 1 in accordance with some embodiments of the disclosed subject matter. Referring to FIG. 2, user device 110 can include a hardware processor 212, a display 214, an input device 216, and memory 218, which can be interconnected. In some embodiments, memory 218 can include a storage device (such as a non-transitory computer-readable medium) for storing a computer program for controlling hardware processor 212.

Hardware processor 212 can use the computer program to execute the mechanisms described herein for initiating requests for a user interface associated with a particular video game, presenting the user interface, initiating requests for media content via the user interface, and/or to perform any other suitable functions in accordance with instructions received as a result of, for example, process 300 described below in connection with FIG. 3 and/or process 400 described below in connection with FIG. 4, and/or to send and receive data through communications link 108. In some embodiments, hardware processor 212 can send and receive data through communications link 108 or any other communications links using, for example, a transmitter, a receiver, a transmitter/receiver, a transceiver, and/or any other suitable communication device. Display 214 can include a touchscreen, a flat panel display, a cathode ray tube display, a projector, a speaker or speakers, and/or any other suitable display and/or presentation devices. Input device 216 can be a computer keyboard, a computer mouse, a touchpad, a voice recognition circuit, a touchscreen, and/or any other suitable input device.

Server 102 can include a hardware processor 222, a display 224, an input device 226, and memory 228, which can be interconnected. In some embodiments, memory 228 can include a storage device for storing data received through communications link 104 or through other links. The storage device can further include a server program for controlling hardware processor 222. In some embodiments, memory 228 can include information stored as a result of user activity (e.g., metadata input by a user, sharing of content by users, requests for content associated with users, etc.), and hardware processor 222 can receive requests to present a user interface associated with a particular video game from user devices 110. In some embodiments, the server program can cause hardware processor 222 to, for example, execute at least a portion of process 300 as described below in connection with FIG. 3, process 400 as described below in connection with FIG. 4 and/or processes describe in connection with FIG. 7.

Hardware processor 222 can use the server program to communicate with user devices 110 as well as provide access to and/or copies of the mechanisms described herein. It should also be noted that data received through communications link 104 or any other communications links can be received from any suitable source. In some embodiments, hardware processor 222 can send and receive data through communications link 104 or any other communications links using, for example, a transmitter, a receiver, a transmitter/receiver, a transceiver, and/or any other suitable communication device. In some embodiments, hardware processor 222 can receive commands and/or values transmitted by one or more user devices 110 and/or one or more users of server 102, such as a user that makes changes to adjust settings associated with the mechanisms described herein for aggregating and presenting content relevant to a particular video game. Display 224 can include a touchscreen, a flat panel display, a cathode ray tube display, a projector, a speaker or speakers, and/or any other suitable display and/or presentation devices. Input device 226 can be a computer keyboard, a computer mouse, a touchpad, a voice recognition circuit, a touchscreen, and/or any other suitable input device.

In some embodiments, server 102 can be implemented in one server or can be distributed as any suitable number of servers. For example, multiple servers 102 can be implemented in various locations to increase reliability and/or increase the speed at which the server can communicate with user devices 110. Additionally or alternatively, as described above in connection with FIG. 1, multiple servers 102 can be implemented to perform different tasks associated with the mechanisms described herein.

Turning to FIG. 3, an example 300 of a process for aggregating and presenting content relevant to a particular video game is shown in accordance with some embodiments of the disclosed subject matter. At 302, process 300 can receive and/or select a video to be classified as being relevant to one or more categories, keywords and/or video games. In some embodiments, process 300 can use any suitable technique or combination of techniques to receive and/or select a video to be classified. For example, process 300 can receive a video to be classified when that video is uploaded and/or shared to a media content platform such as a video hosting and/or sharing platform. As another example, process 300 can select a video to be classified from all videos or a subset of videos available from a video hosting and/or sharing platform.

In some embodiments, process 300 can select a video to be classified based on an amount of time that has passed since the video has been previously classified. For example, in some embodiments, when a video is initially uploaded (and/or shared) to a video hosting and/or sharing platform, process 300 can initially classify the video. In such an example, process 300 can select the video to be classified after a threshold period of time has elapsed since the video was initially classified, and can perform an updated classification on the selected video.

In some embodiments, process 300 can select a video to be classified based on a number of times that the video has been requested for presentation since the video has been previously classified. For example, in some embodiments, when a video is initially uploaded (and/or shared) to a video hosting and/or sharing platform, process 300 can initially classify the video. In such an example, process 300 can select the video to be classified after the video has been requested at least a predetermined number of times since the video was initially classified, and can perform an updated classification on the selected video.

In some embodiments, process 300 can update the classification of a particular video any suitable number of times and in response to any suitable factors. For example, process 300 can periodically update the classification for all videos based on available computing resources of a server or servers (e.g., server 102) executing process 300.

Note that, although the mechanisms described herein are generally described in connection with videos related to particular video games, the mechanisms described herein can be used with any suitable types of media content (e.g., text documents, audio, video, etc.) related to any particular media content item of any suitable type (e.g., a video game or a series of video games, a movie or a series of movies, a book or a series of books, a television series, a song, a collection of songs, etc.) and/or a collection of different types of media content items related to a single subject (e.g., movies and comic books about the same characters, books and television series about the same stories, etc.). Additionally, the mechanisms described herein can be used with any type of product and/or service that is not necessarily a type of media content, such as restaurants, consumer electronics, etc.

At 304, process 300 can identify information that is to be used in associating the video with one or more categories, keywords and/or video games. In some embodiments, process 300 can identify any suitable information to be used in associating the video with one or more categories, keywords and/or video games. For example, process 300 can identify metadata that was input by a user (e.g., a user that uploaded the video, a user that requested that the video be presented, etc.) as information that is to be used in associating the video with one or more categories, keywords and/or video games. As another example, process 300 can identify metadata associated with the video that may not have been input by a user, such as closed captioning information (which may have been automatically generated), metadata generated using one or more image analysis techniques to analyze the image content of the video, etc.

As yet another example, process 300 can identify information related to other videos that are often requested by and presented to users that also requested and were presented with the selected video. In such an example, the context in which the other videos and the selected video were requested and/or presented can also be identified. In a more particular example, if a user entered a search for a particular video game and watched another video that has been classified as relating to that game, and also watched the selected video, process 300 can identify this context as information that is to be used in associating the selected video with one or more categories, keywords and/or video games.

As still another example, process 300 can identify information related to other videos that are in a playlist of videos with the video received and/or selected at 302. In a more particular example, process 300 can identify whether the received and/or selected video is included in any playlists, and can identify information related to the other videos in those playlists.

At 306, process 300 can determine, based on the information identified at 304, a likelihood that the video is relevant to each of one or more categories, keywords and/or video games. Process 300 can use any suitable technique of combination of techniques to determine a likelihood that the video is relevant to each of the one or more categories, keywords and/or video games. For example, process 300 can use a trained classification model to determine a category or categories to which the video is likely to be relevant, and a likelihood or confidence associated with the determination. Similarly, in such an example, process 300 can use the same or a different trained classification model to determine a keyword or keywords to which the video is likely to be relevant, and/or to which video game or video games the video is likely to be relevant.

In some embodiments, a trained classification model can be trained using any suitable techniques, which can include presenting a video to a human oracle and requesting that the human oracle classify the video as being relevant to one or more categories, keywords and/or video games, presenting the video to the human oracle and requesting that the human oracle determine whether a classification by the trained classification model was made correctly, etc.

As another example, process 300 can use any other suitable technique to automatically and/or manually determine, based on the information identified at 304, a likelihood that the video is relevant to each of one or more categories, keywords and/or video games.

In some embodiments, process 300 can determine a likelihood that the video is relevant to any suitable categories such as music videos, comedy videos, movies, videos relevant to video games, etc. In some embodiments, process 300 can determine a likelihood that the received and/or selected video is relevant to each category and/or a subset of all categories (where the subset can be selected using any suitable technique or combination of techniques). Additionally, in some embodiments, process 300 can determine a likelihood that the video is relevant to any suitable sub-categories which are related to a broader category. For example, process 300 can determine the likelihood that the video is relevant to a video game category, and can also determine the likelihood that the video includes a review of a video game, game play of a video game, etc.

In some embodiments, process 300 can determine a likelihood that the contents of the video and/or metadata associated with the video is spam. If process 300 determines that the likelihood that the video is spam is over a threshold likelihood, process 300 can use this information to reduce the visibility of the video (e.g., make the video appear further down in lists of videos and/or search results than it otherwise would) and/or inhibit other classifications of the video (e.g., use the designation as spam to inhibit the designation that the video is relevant to a particular video game). Additionally, in some embodiments, process 300 can inform a user that uploaded the video that the video has been designated as spam and give that user feedback as to why the video was designated as spam.

In some embodiments, the categories for which process 300 makes a likelihood determination can include any suitable categories that are potentially relevant to all types of videos, such as live streaming content, review content, promotional content, interview content, etc. Additionally, in some embodiments, the categories for which process 300 makes a likelihood determination can include categories that are specific to games, such as game play videos, walkthroughs, hint videos, complete play through videos (e.g., a playlist of videos showing a relatively complete play of a game from beginning to an ending point), speed runs, etc.

In some embodiments, process 300 can determine that the likelihood that the video is promotional content from a publisher of a video game is relatively high if the video is determined to be related to a game from the published and the video was uploaded from an account that has been verified to be associated with the published.

In some embodiments, process 300 can determine a likelihood that the video is relevant to any suitable keywords which can identify people and/or characters in the video, a subject of the video, topics that are discussed or referenced in the video, a title of the video, and/or any other suitable keywords that may be relevant to the video. As another example, a keyword can be relevant to a video if the keyword is a term that a user searching for the video might enter in a search query. In some embodiments, process 300 can select the keywords for which a likelihood is to be determined using any suitable technique or combination of techniques.

In some embodiments, process 300 can determine the likelihood that the video is relevant to a particular video game or video games from a collection of video games. Such a collection of video games can be identified and/or constructed using any suitable technique or combination of techniques. In some embodiments, process 300 can determine a likelihood that the received and/or selected video is relevant to each video game of the collection and/or a subset of all video games of the collection (where the subset can be selected using any suitable technique or combination of techniques).

In some embodiments, in addition to determining the likelihood that a particular received and/or selected video is relevant to one or more categories, keywords and/or video games, process 300 can determine a likelihood that a group of multiple videos (e.g., videos in a playlist) is relevant to one or more categories, keywords and/or video games.

At 308, process 300 can associate the video received and/or selected at 302 with one or more categories, keywords and/or video games for which the likelihood that the video is relevant to those one or more categories, keywords and/or video games is over a threshold. In some embodiments, process 300 can use any suitable threshold in determining which categories, keywords and/or video games to which the video game is relevant. For example, if process 300 determines that it is more likely than not that the video is relevant to a particular category, process 300 can associate that category with the video. As another example, if process 300 determines that the video is relevant to a particular video game with ninety percent confidence, process 300 can associate the video with that video game. Note that the threshold likelihoods and/or confidence values are merely given as examples and any suitable threshold likelihoods and/or confidence values can be used in connection with the mechanisms described herein.

In some embodiments, process 300 can use different thresholds for different types of classifications, and/or different types of categories and/or keywords. For example, process 300 can determine which category or categories are to be associated with the video based on a lower threshold level of likelihood than when determining which video game is to be associated with the video (if any).

In some embodiments, process 300 can associate the video with a single video game to the exclusion of other video games to which the video may be relevant. For example, if process 300 determines that the likelihood that video is relevant to multiple video games over a threshold likelihood for each of the games, process 300 can nevertheless select a single video game to associate with the video. In some embodiments, process 300 can select the video game for which the video has the highest likelihood of being relevant.

At 310, process 300 can generate instructions for causing a user device to present a user interface for a particular video game, including at least a portion of videos associated with the video game. In some embodiments, process 300 can generate the instructions and/or a portion of the instructions at any suitable time and/or using any suitable technique or combination of techniques. For example, process 300 can generate the instructions in response to one or more videos initially being associated with a video game to which the user interface corresponds. As another example, process 300 can generate and/or update the instructions at regular and/or irregular intervals based on current classifications of videos that have been associated with one or more categories, keywords and/or video games at 308. In a more particular example, process 300 can generate updated instructions each time a video is newly associated with the video game to which the user interface corresponds. In another more particular example, process 300 can generate updated instruction each time the user interface is requested for presentation.

Additionally, in some embodiments, the user interface can include any suitable content and user interface elements, and/or can be arranged in any suitable configuration. For example, as described below in connection with FIGS. 5A, 5B and 6, the user interface can include metadata about the video game corresponding to the user interface and representations of one or more of the videos that have been associated with the video game.

Figure 4:
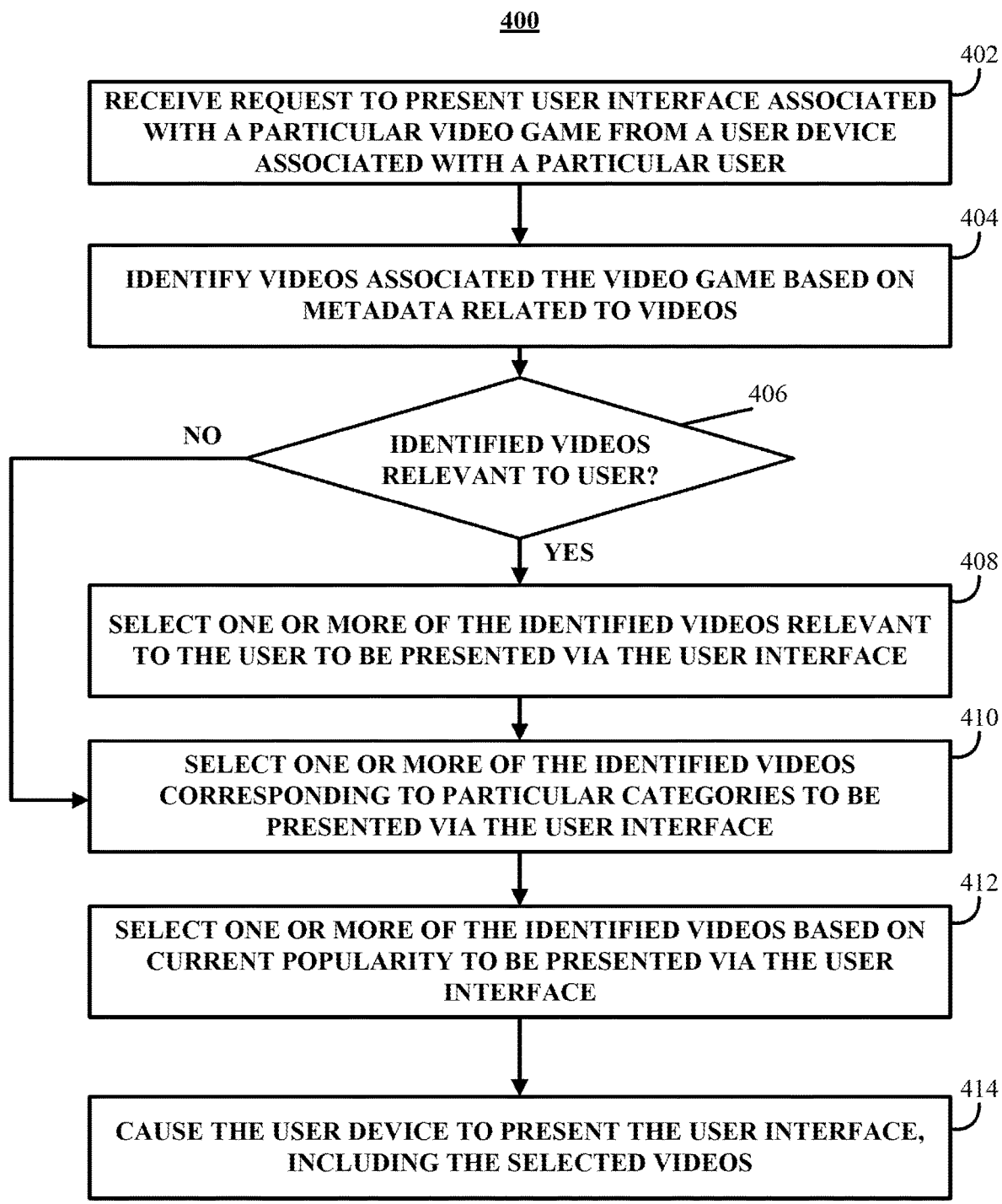
FIG. 4 shows an example of a process for generating instructions for causing a user interface to be presented that is relevant to a particular video game in accordance with some embodiments of the disclosed subject matter.

FIG. 4 shows an example 400 of a process for generating instructions for causing a user interface to be presented that is relevant to a particular video game in accordance with some embodiments of the disclosed subject matter. In some embodiments, one or more portions of process 400 can be executed in connection with 310 described above in connection with FIG. 3. As shown in FIG. 4, process 400 can receive a request to present a user interface associated with a particular video game. Additionally, in some embodiments, the request can be received from a user device associated with a particular user (e.g., a user that has logged in to a service that provides that user interface). In some embodiments, process 400 can use any suitable technique or combination of techniques to receive the request and the request can be received at any suitable time.

At 404, process 400 can identify videos that are associated with the video game based on metadata related to videos that can potentially be presented using the requested user interface. In some embodiments, process 400 can identify videos associated with the video game at any suitable time and/or using any suitable technique or combination of techniques. For example, in some embodiments, process 400 can identify videos associated with the video game at regular and/or irregular intervals. In such an example, process 400 can identify videos associated with the video game at times that are unrelated to receiving requests for the user interface that is to be used to present representations of videos associated with the video game (e.g., not in response to the request received at 402). As another example, process 400 can identify videos associated with the video game in response to receiving the request to present the user interface associated with the video game at 402.

In some embodiments, another process (e.g., process 300) can associate videos with particular video games, and identifying videos associated with the video game can include querying a database for identifying information of videos that have been associated with the video game.

At 406, process 400 can determine if one or more of the videos identified at 404 is relevant to the user associated with the user device from which the request was received at 402. In some embodiments, process 400 can determine that a video is relevant to a user based on any suitable factor or combination of factors. For example, process 400 can determine that a particular video is relevant to the user if the user subscribes to videos from a user that uploaded the video (e.g., that the user subscribes to a channel on which the video has been uploaded). As another example, process 400 can determine that a particular video is relevant to the user if the video has been requested and/or enjoyed by a group of other users that watch and/or enjoy similar videos as the user. As yet another example, process 400 can determine that a particular video is relevant to the user if that video has been shared with the user (e.g., by another user that is a social connection of the requesting user), but not yet requested by the user and/or not presented for at least a threshold amount of time to the user.

If process 400 determines that one or more of the videos identified at 404 are relevant to the requesting user ("YES" at 406), process 400 can proceed to 408. At 408, process 400 can select one or more of the identified videos that are relevant to the user as videos that are to be represented in the user interface. Process 400 can use any suitable technique or combination of techniques to determine which of the videos relevant to the user to select for representation in the user interface. For example, process 400 can select the most recent videos that are relevant to the user. As another example, process 400 can select videos that have been determined (using any suitable process) to be videos that the user is likely to enjoy. As yet another example, process 400 can select videos based on the overall popularity of the videos.

Otherwise, if process 400 determines that none of the videos identified at 404 are relevant to the requesting user ("NO" at 406), process 400 can proceed to 410. At 410, process 400 can select one or more of the identified videos corresponding to each of a particular group of categories that are to be included in the user interface. As described above in connection with 408, process 400 can use any suitable technique or combination of techniques to select videos corresponding to each category, such as the most popular videos corresponding to those categories, the most recent videos corresponding to those categories, the videos corresponding to that category that are most likely to be relevant to that category, etc.

In some embodiments, the categories for which videos are selected can include any suitable categories that may be particularly relevant to video games (or whatever the topic is that the user interface represents). For example, the categories can include a category corresponding to videos that include a review of the video game (i.e., review videos). As yet another example, the categories can include a category corresponding to videos (e.g., game play videos) or groups of videos (e.g., let's play videos) that include game play from a portion of the game and/or a play through of the game. As still another example, the categories can include a category corresponding to impressive play through at least a portion of the game (e.g., speed runs, etc.). As a further example, the categories can include categories corresponding to commentary, interviews, music, etc., related to the game. As a still further example, the categories can include a category corresponding to live streamed content related to the game.

At 412, process 400 can select one or more of the identified videos based on the overall and/or trending popularity of the videos that are to be included in the user interface. In some embodiments, process 400 can select popular videos using any suitable technique or combination of techniques to determine which of the identified videos are more popular. For example, in some embodiments, process 400 can determine which of the identified videos are popular videos based on which videos have been requested the most times in any suitable period of time (e.g., up to and including since the service providing the video began operation). As another example, process 400 can determine which of the identified videos are popular videos based on which videos have received the most indications that the users requesting the video enjoyed it (e.g., videos that had the most "likes," "thumbs ups," "plusses," etc.).

In some embodiments, the popular videos can be selected from videos that were not selected at 408 and/or 410. Alternatively, the popular videos can be selected from all identified videos, and the videos selected at 408 and/or 410 can be selected from among videos that were not selected at 412. As another alternative, selection of videos at 408, 410 and 412 can be partially or completely independent such that the same video may be selected at 408, 410 and 412 as being a video that is relevant to the user, a video that corresponds to a particular category, and a popular video, respectively.

In some embodiments, the number of videos that are selected at 408 from among videos relevant to the user, at 410 for each category, and/or at 412 based on popularity can be determined based on any suitable factor or factors. For example, the number can be set by a user (e.g., an administrator or programmer associated with process 400, a user selection via the user interface, etc.). As another example, the number can be determined based on a total number of videos related to the game. As yet another example, the selection of videos can include determining an order in which representations of the videos are to be presented in the user interface, and may not limit how many videos are presented in the user interface. In such an example, representations of all videos meeting certain criteria can be presented for browsing in the user interface upon navigation through the user interface (e.g., by scrolling, etc.).

Note that, in some embodiments, in addition to or in lieu of selecting videos at 408, 410 and/or 412, process 400 can select playlists of videos. Additionally, although process 400 is described in connection with videos, as described above, any suitable media content or combinations of types of media content can be selected using process 400 that is relevant to any suitable product or topic (e.g., not only video games).

At 414, process 400 can cause the user device that requested the user interface to present the user interface, including representations of the selected videos. In some embodiments, process 400 can cause the user interface to be presented using any suitable technique or combination of techniques. For example, process 400 can respond to the request to present the user interface with instructions (e.g., HTML code) that cause the user device to present a web page that includes the user interface. As another example, process 400 can provide identifying information that is to be used to populate a user interface with representations of videos selected using process 400. In such an example, the user device can present graphics associated with the user interface based on instructions that were received from another source, and can retrieve metadata for videos that are to be included in the user interface based on the received identifying information. In such an example, the graphics associated with the user interface can be a web page that was loaded by a web browser executing on the user device based on instructions received via a process other than process 400. Additionally or alternatively, the graphics associated with the user interface can be loaded by an application executing on the user device that can be used to browse for and/or present videos related to video games in accordance with the mechanisms described herein. Such an application can include instructions received from a server that are stored in memory and/or storage of the user device, and the user interface can be populated with representations of videos and/or other user interface elements based on the identifying information of videos provided by process 400.

Note that, in some embodiments, one or more portions of user interface 400 (e.g., 404, 410 and 412) can be executed at any suitable time (e.g., at regular and/or irregular intervals) as a background process and/or can be used to select videos for the user interface across a particular group of users (e.g., all users, users in a particular country or region, users that use a particular language, etc.). Additionally, in some embodiments, one or more portions of user interface 400 (e.g., 402, 406, 408 and 414) can be executed in response to communications from a user device.

Figure 5A:
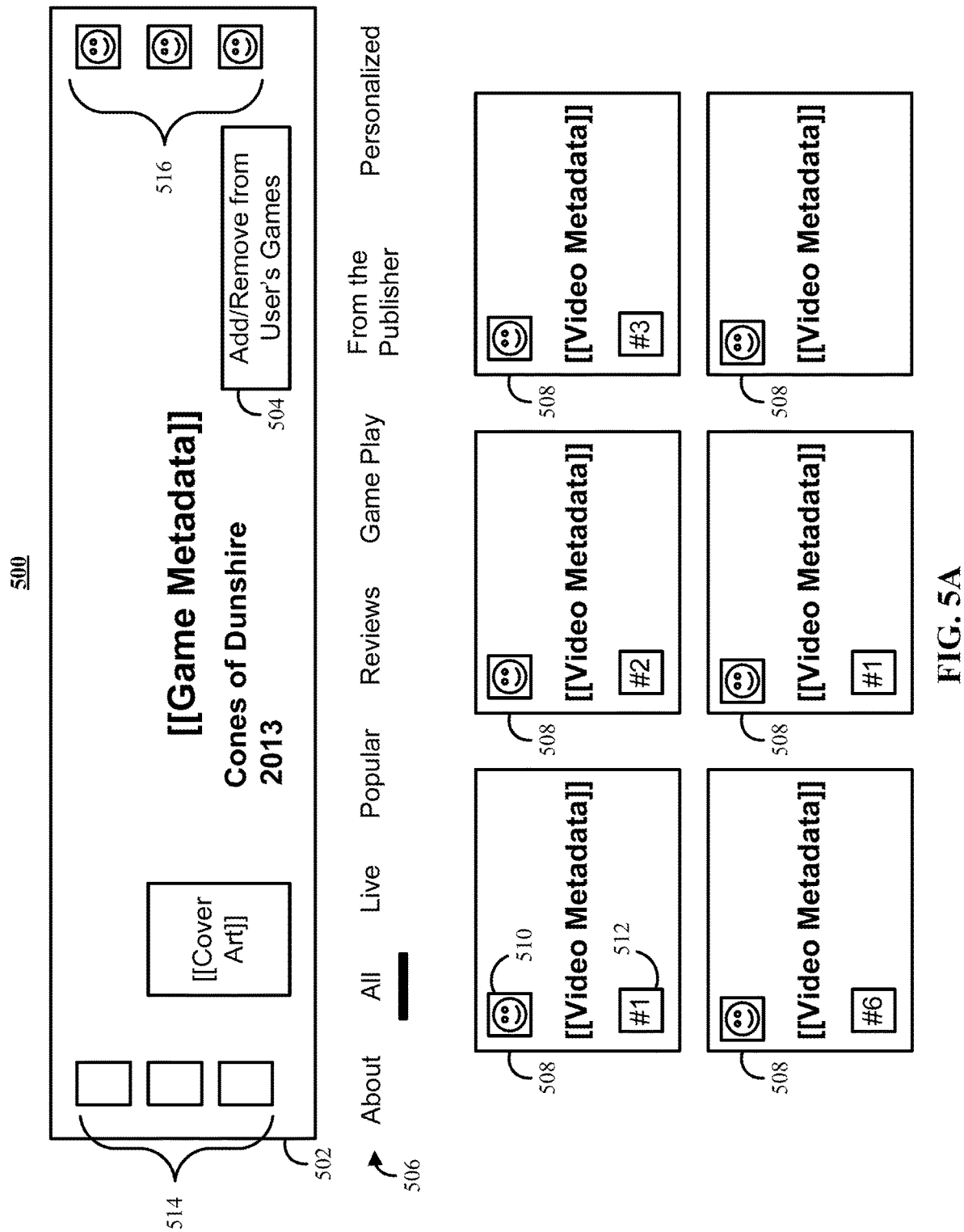
FIGS. 5A and 5B show examples of user interfaces for presenting content relevant to a particular video game in accordance with some embodiments of the disclosed subject matter.

FIG. 5A shows an example 500 of a user interface for presenting content relevant to a particular video game in accordance with some embodiments of the disclosed subject matter. As shown in FIG. 5A, user interface 500 can include metadata 502 related to the game such as a title (e.g., "Cones of Dunshire"), a release data (e.g., "2013"), cover art from the game, other image data related to the game (e.g., as a background for metadata 502), etc.

In some embodiments, user interface 500 can include a user interface element 504 that can be used to add or remove the game from a group of games that a user that is logged in has added to a list of favorites and/or games that they are interested in. In some embodiments, user interface 500 can include user interface elements 506 which can be tabs that each represent a different portion of user interface 500 which can be used to access and/or navigate to different portions of user interface 500. For example, as shown in FIG. 5, user interface 500 can include in tabs 506 a tab for "About" which can include further information about the game to which the user interface corresponds. As another example, user interface 500 can include in tabs 506 a tab for "All" which can include selected videos from other tabs. In such an example, the "All" tab may include videos from any or all of the other tabs and can include any suitable number of videos. As shown in FIG. 5A, the "All" tab is currently selected and presenting representations of videos that can be selected for presentation to a user that are each represented by video identifying information 508. As yet another example, user interface 500 can include any other suitable tabs in tabs 506, such as a tab for "Live" content (e.g., livestreaming content related to "Cones of Dunshire"), a tab for "Reviews" (e.g., videos that include a review of "Cones of Dunshire"), a tab for "Game Play" videos (e.g., videos that include game play such as a "let's play" playlist, a speed run, and/or any other game play that may not be a review of the game), a tab for videos "From the Publisher" (e.g., videos that were uploaded by an account associated with the publisher of "Cones of Dunshire"), a "Personalized" tab (e.g., videos that are relevant to the user, such as videos selected as described above in connection with 408 of FIG. 4).

In some embodiments, user interface 500 can include one or more videos represented by video identifying information 508. Such video identifying information can include any suitable information, such as video metadata (e.g., title, a screenshot representing the video, run time, number of videos for a playlist of videos, etc.), an icon 510 representing an uploader and/or channel associated with the video, and an icon 512 indicating a category with which the video is associated. The category represented by category icon 512 can, for example, represent whether the video is a popular video, a live video, a review, a gameplay video, etc. Note that, in some embodiments, a particular video may not be associated with a category icon 512. For example, category icons 512 can be restricted to a certain subset of categories and videos not associated with one of those categories may not include a category icon in video identifying information 508.

In some embodiments, user interface 500 can include one or more game icons 514 that can each represent a video game which the user has previously added to the user's games (e.g., using user interface element 504 to add the game). Any suitable number of game icons 514 can be shown, and an order in which game icons 514 are presented can be determined using any suitable technique or combination of techniques. In some embodiments, selection of a particular game icon 514 can cause a user interface for that game to be presented by a user device presenting user interface 500.

In some embodiments, user interface 500 can include one or more channel icons 516 that can each represent a channel to which the user has subscribed. Any suitable number of channel icons 516 can be shown, and an order in which channel icons 516 are presented can be determined using any suitable technique or combination of techniques. In some embodiments, selection of a particular channel icon 516 can cause a user interface for that channel to be presented by a user device presenting user interface 500.

Figure 5B:
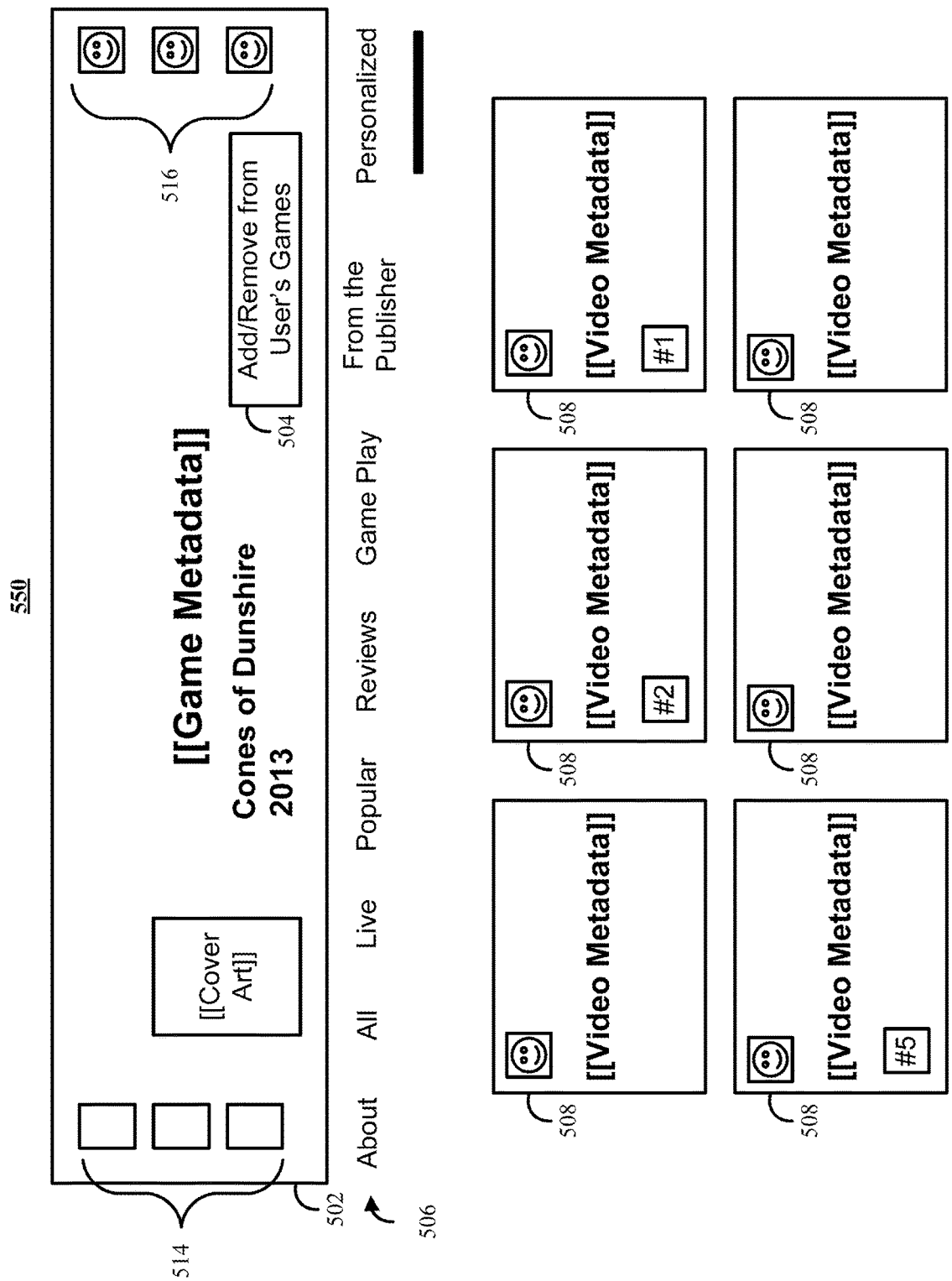

FIG. 5B shows an example 550 of the user interface for presenting content relevant to a particular video game in accordance with some embodiments of the disclosed subject matter. As shown in FIG. 5B, the "Personalized" tab in tabs 506 has been selected, and the videos represented via video identifying information 508 have been changed to reflect videos that were selected based on relevance to a user (e.g., as described above in connection with 408 of FIG. 4).

Figure 6:
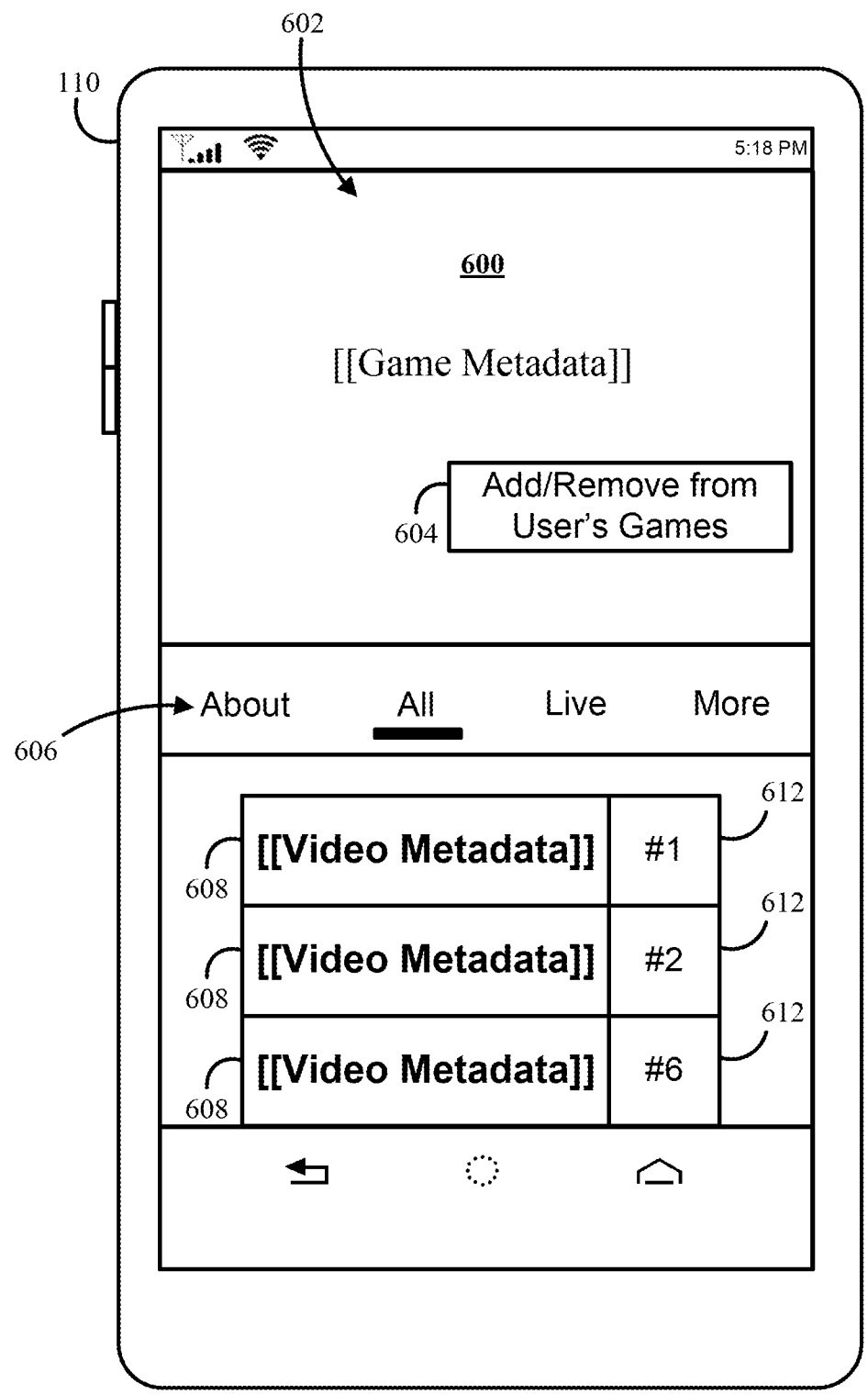
FIG. 6 shows an example of a user interface for presenting content relevant to a particular video game on a mobile device in accordance with some embodiments of the disclosed subject matter.

FIG. 6 shows an example 600 of a user interface for presenting content relevant to a particular video game on a mobile device in accordance with some embodiments of the disclosed subject matter. As shown in FIG. 6, user interface 600 can include metadata 602 related to the game, which can include similar information to what is included in metadata 502 described above in connection with FIG. 5A, but formatted for a screen associated with user device 110.

In some embodiments, user interface 600 can include a user interface element 604 that can be used to add or remove the game from a group of games that a user that is logged in has added to a list of favorites and/or games that they are interested in. In some embodiments, user interface 600 can include user interface elements 606 which can be tabs that are similar to tabs 506 described above in connection with FIG. 5A, but formatted for operation using one or more input devices of user device 110 and/or formatted for the screen of user device 110.

In some embodiments, user interface 600 can include one or more videos represented by video identifying information 608, which can be similar to video identifying information 508 described above in connection with FIG. 5A, but formatted for the smaller screen size of user device 110. Similarly, user interface 600 can include, in some embodiments, an icon 612 indicating a category with which a video is associated, which can be similar to icon 512 described above in connection with FIG. 5A.

Figure 7:
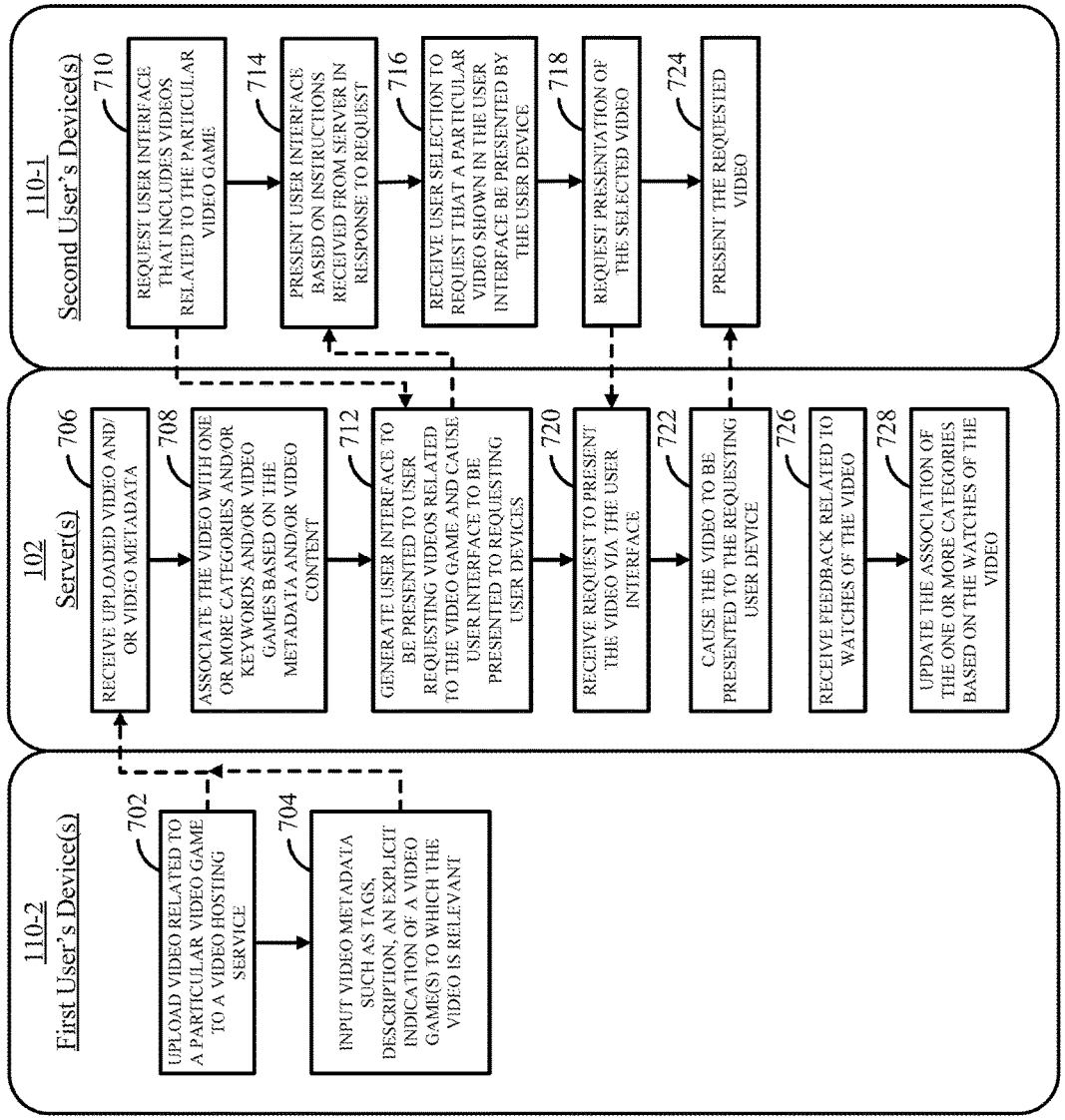
FIG. 7 shows an example of a data flow that can be used in conjunction with the processes described in connection with FIGS. 3 and/or 4 for aggregating and presenting content relevant to a particular video game as described herein can be implemented in accordance with some embodiments.

FIG. 7 shows an example 700 of a data flow that can be used in conjunction with the processes described above in connection with FIGS. 3 and/or 4 for aggregating and presenting content relevant to a particular video game as described herein can be implemented in accordance with some embodiments. At 702, a first user device 110-1 can upload a video related to a particular video game to a server or servers 102 associated with a video hosting and/or sharing service. In some embodiments, the video can be uploaded using any suitable technique or combination of techniques and using any suitable user interface.

At 704, user device 110-1 can receiver user input specifying video metadata associated with the video, which can include any suitable user identified information related to the video. For example, the video metadata specified by user input at 704 can include tags identifying things that the video may be relevant to, a title, descriptive information which may be input as narrative format, an indication of which video game or video games the video is related to (which may be chosen from a prefilled list or other predefined set of video games), and/or any other suitable metadata. In such an example, a user may be restricted to specifying a single video game to which the video is relevant.

At 706, server 102 can receive the uploaded video and/or the video metadata input to user device 110-1. In some embodiments, server 102 can receive the uploaded video and/or video metadata using any suitable technique or combination of techniques.

At 708, server 102 can associate the video with one or more categories, keywords and/or video games based on the received metadata and/or any other suitable information. For example, server 102 can use at least a portion of process 300 described above in connection with FIG. 3 to associate the video with one or more categories, keywords and/or video games.

At 710, a second user device 110-2 can request a user interface that includes videos that are related to the video game. In some embodiments, second user device 110-2 can cause such a request to be submitted to server 102 using any suitable technique such as by requesting content from a particular uniform resource locator (URL) using a web browser, requesting content associated with a particular video game using an application for presenting such content, etc.

At 712, server 102 can generate a user interface that is to be presented by user device 110-2 that requested videos related to the video game, and can cause the user interface to be presented by user device 110-2. In some embodiments, server 102 can generate the user interface and/or cause the user interface to be presented by user device 110-2, such as techniques described above in connection with 310 and/or 414 in connection with FIGS. 3 and 4, respectively.

At 714, user device 110-2 can present the user interface based on instructions and/or other information (e.g., identifying information for videos that are to be used to populate the user interface) received from server 102 in response to the request to present the user interface at 702. User device 110-2 can use any suitable application and technique or combination of techniques to present the user interface at 714, and can present any suitable user interface (e.g., user interface 500 or 600 described above in connection with FIGS. 6 and 7).

At 716, user device 110-2 can receive user input (e.g., via an input device such as a mouse, keyboard, touch screen, etc.) to request that a particular video represented in the user interface be presented by user device 110-2. For example, user device 110-2 can receive user input selecting identifying information of a video (e.g., video identifying information 508 or 608).

At 718, user device 110-2 can request presentation of the video selected at 716. In some embodiments, user device 110-2 can request presentation of the video using any suitable technique or combination of techniques.

At 720, server 102 can receive the request to present the selected video via the user interface, and at 722 can cause the video to be presented by user device 110-2 that requested presentation of the video. In some embodiments, server 102 can use any suitable technique or combination of techniques to receive the request for the video and/or to cause the video to be presented by user device 110-2.

At 724, user device 110-2 can present the requested video using any suitable user interface and/or at any suitable size. For example, user device 110-2 can present the video within the user interface used to present representations of the videos related to the video game. As another example, user device 110-2 can present the video in a new window and/or new tab that is used to present the video. As yet another example, user device 110-2 can navigate to a web page or other suitable user interface associated with the video and can present the video using that user interface. As still another example, user device 110-2 can present the video in a "full screen" mode in which the video takes up an entire screen and may be presented in lieu of another user interface.

In some embodiments, user device 110-2 can send feedback to server 102 in connection with presentation of the video by user device 110-2 at 724. Such feedback can include passive information such as how much of the video was presented or active information such as user input received by the user interface associated with presentation of the video indicating that the user enjoyed the content.

At 726, server 102 can receive feedback related to presentation of the video (and/or presentation of any other suitable videos). As described above, this feedback can include how much of the video was presented by a user device, as well as user input received at the user device indicating that the user enjoyed or did not enjoy the video, a user request to share the video with others (e.g., by sending a link, by posting the video to a social network, etc.), user input indicating that the video is incorrectly classified (e.g., that the video was associated with the wrong game), and/or any other suitable feedback.

At 728, server 102 can update the association of the one or more categories, keywords and/or video games based on the feedback related to presentation of the video. For example, server 102 can update the associations as described above in connection with FIG. 3.

In some embodiments, the mechanisms described herein can include server-side software, client-side software, server-side hardware, client-side hardware, firmware, or any suitable combination thereof. For example, these mechanisms can encompass one or more web pages or web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches). As another example, these mechanisms can encompass a computer program that causes a processor (such as hardware processor 112 and/or hardware processor 122) to execute the mechanisms described herein. For instance, these mechanisms can encompass a computer program written in a programming language recognizable by user device 110, and/or server 102 that is executing the mechanisms (e.g., a program written in a programming language, such as, Java, C, Objective-C, C++, C#, JavaScript, Visual Basic, HTML, XML, ColdFusion, any other suitable approaches, or any suitable combination thereof).

In situations in which the mechanisms described herein collect personal information about users, or can make use of personal information, the users can be provided with an opportunity to control whether programs or features collect user information (e.g., information about user actions stored on a user device 110, information about user actions stored on a remote device such as server 102, etc.), or to control whether and/or how to receive messages for promoting content. In addition, certain data can be treated in one or more ways before it is stored or used, so that personal information is removed. For example, a user's identity can be treated so that no personal information can be determined for the user, or a user's geographic location can be generalized where location information is obtained (such as to a city, ZIP code, or state level), so that a particular location of a user cannot be determined. Thus, the user can have control over how information is collected about the user and used by a content server.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In some embodiments of the disclosed subject matter, the above described steps of the processes of FIGS. 3, 4 and 7 can be executed or performed in any order or sequence not limited to the order and sequence shown and described in the figures. Also, some of the above steps of the processes of FIGS. 3, 4 and 7 can be executed or performed substantially simultaneously where appropriate or in parallel to reduce latency and processing times. Furthermore, it should be noted that FIGS. 3, 4 and 7 are provided as examples only. At least some of the steps shown in these figures may be performed in a different order than represented, performed concurrently, or omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Accordingly, methods, systems, and media for aggregating and presenting content relevant to a particular video game are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for presenting videos related to a common subject, the method comprising:
   receiving, using a hardware processor, a video that has been uploaded by a user to a video sharing platform;
   determining, using the hardware processor, identifying information for association the video with a video game from a plurality of video games and a category from a plurality of categories, wherein the identifying information includes metadata that was inputted by the user, metadata generated from a content portion of the video, and information related to other videos that are in a playlist of videos with the received video;
   determining, using the hardware processor, a likelihood that the video is relevant to each category in the plurality of categories based on the identifying information;
   associating, using the hardware processor, the video with a video game and a category based on the determined likelihood;
   receiving, using the hardware processor, a corpus of videos related to a variety of subjects that are available from the video sharing platform;
   classifying, using the hardware processor, the corpus of videos related to the variety of subjects that are available from the video sharing platform to identify a plurality of videos related to the video game, wherein each video from the plurality of videos is identified as being related to the video game in response to determining that at least a subset of the plurality of videos are included in the playlist of videos classified as associated with the video game;
   selecting, for each of a plurality of categories, from the plurality of videos, a first subset of videos that includes one or more videos relevant to that category, wherein one of the plurality of categories includes videos that are currently being live streamed in which users are playing the video game;
   selecting, from the plurality of videos, a second subset of popular videos that includes one or more videos based on popularity of each of the plurality of videos, wherein the popularity of each of the plurality of videos corresponds to a number of requesting users that provided an indication of enjoying that video;
   receiving a request from a user device to present a user interface including representations of videos related to the video game;
   determining videos that are relevant to the user device from which the request was received based on user subscription information for a user associated with the user device, wherein the user subscription information indicates that the user has subscribed to a plurality of channels on which each of the relevant videos has been uploaded, wherein each of the plurality of channels contains a collection of user-selected video content associated with other users of the video sharing platform;
   in response to receiving the request to present the user interface, selecting a third subset of videos that includes one or more of the videos based on the user subscription information;
   causing the user device to present the user interface having a plurality of portions including at least a first portion that includes representations of videos relevant to a first of the plurality of categories that includes videos that are currently being live streamed in which users are playing the video game from the first subset of videos, a second portion that includes representations of videos selected based on popularity from the second subset of videos, and a third portion that includes representations of videos selected based on the user subscription information from the third subset of videos, wherein the user interface allows a user of the user device to select user interface elements to switch between the first portion, the second portion, and the third portion;
   receiving a request to present a video selected via the user interface; and
   causing the user device to present the requested video.

2. The method of claim 1, wherein the plurality of categories includes at least one of the following categories: videos that include a review of the video game; and videos uploaded by a publisher of the game.

3. The method of claim 1, wherein the user interface includes metadata related to the video game including a title of the game and one or more images related to the video game.

4. The method of claim 1, wherein the user interface includes a fourth portion that includes videos relevant to a second of the plurality of categories, and wherein the user interface includes a plurality of user interface elements each corresponding to one of the plurality of portions such that selection of the user interface element corresponding to a particular portion causes representations of videos included in that portion to be presented via the user interface.

5. The method of claim 4, wherein the user interface includes a fifth portion that includes representations of at least one video from each of the first through fourth portions.

6. The method of claim 5, wherein the plurality of user interface elements are presented as tabs over an area of the user interface in which representations of videos from a selected tab are presented.

7. The method of claim 4, wherein each video presented in the first portion that is associated with a category of the plurality of categories is presented in association with an icon identifying the category associated with that video.

8. A system for presenting videos related to a common subject, the system comprising:
   a hardware processor that is programmed to:
      receive a video that has been uploaded by a user to a video sharing platform,
      determine identifying information for association the video with a video game from a plurality of video games and a category from a plurality of categories, wherein the identifying information includes metadata that was inputted by the user, metadata generated from a content portion of the video, and information related to other videos that are in a playlist of videos with the received video;

determine a likelihood that the video is relevant to each category in the plurality of categories based on the identifying information;

associate the video with a video game and a category based on the determined likelihood;

receive a corpus of videos related to a variety of subjects that are available from the video sharing platform;

classify the corpus of videos related to the variety of subjects that are available from the video sharing platform to identify a plurality of videos related to the video game, wherein each video from the plurality of videos is identified as being related to the video game in response to determining that at least a subset of the plurality of videos are included in the playlist of videos classified as associated with the video game;

select, for each of a plurality of categories, from the plurality of videos, a first subset of videos that includes one or more videos relevant to that category, wherein one of the plurality of categories includes videos that are currently being live streamed in which a user is playing the video game;

select from the plurality of videos, a second subset of popular videos that includes one or more videos based on popularity of each of the plurality of videos, wherein the popularity of each of the plurality of videos corresponds to a number of requesting users that provided an indication of enjoying that video;

receive a request from a user device to present a user interface including representations of videos related to the video game;

determine videos that are relevant to the user device from which the request was received based on user subscription information for a user associated with the user device, wherein the user subscription information indicates that the user has subscribed to a plurality of channels on which each of the relevant videos has been uploaded, wherein each of the plurality of channels contains a collection of user-selected video content associated with other users of the video sharing platform;

in response to receiving the request to present the user interface, select a third subset of videos that includes one or more of the videos based on the user subscription information;

cause the user device to present the user interface having a plurality of portions including at least a first portion that includes representations of videos relevant to a first of the plurality of categories that includes videos that are currently being live streamed in which users are playing the video game from the first subset of videos, a second portion that includes representations of videos selected based on popularity from the second subset of videos, and a third portion that includes representations of videos selected based on the user subscription information from the third subset of videos, wherein the user interface allows a user of the user device to select user interface elements to switch between the first portion, the second portion, and the third portion;

receive a request to present a video selected via the user interface; and cause the user device to present the requested video.

9. The system of claim 8, wherein the plurality of categories includes at least one of the following categories: videos that include a review of the video game; and videos uploaded by a publisher of the game.

10. The system of claim 8, wherein the user interface includes metadata related to the video game including a title of the game and one or more images related to the video game.

11. The system of claim 8, wherein the user interface includes a fourth portion that includes videos relevant to a second of the plurality of categories, and wherein the user interface includes a plurality of user interface elements each corresponding to one of the plurality of portions such that selection of the user interface element corresponding to a particular portion causes representations of videos included in that portion to be presented via the user interface.

12. The system of claim 11, wherein the user interface includes a fifth portion that includes representations of at least one video from each of the first through fourth portions.

13. The system of claim 12, wherein the plurality of user interface elements are presented as tabs over an area of the user interface in which representations of videos from a selected tab are presented.

14. The system of claim 11, wherein each video presented in the first portion that is associated with a category of the plurality of categories is presented in association with an icon identifying the category associated with that video.

15. A non-transitory computer-readable medium containing computer executable instructions that, when executed by a processor, cause the processor to perform a method for presenting videos related to a common subject, the method comprising:

receiving a video that has been uploaded by a user to a video sharing platform;

determining identifying information for association the video with a video game from a plurality of video games and a category from a plurality of categories, wherein the identifying information includes metadata that was inputted by the user, metadata generated from a content portion of the video, and information related to other videos that are in a playlist of videos with the received video;

determining a likelihood that the video is relevant to each category in the plurality of categories based on the identifying information;

associating the video with a video game and a category based on the determined likelihood;

receiving a corpus of videos related to a variety of subjects that are available from the video sharing platform;

classifying the corpus of videos related to the variety of subjects that are available from the video sharing platform to identify a plurality of videos related to the video game, wherein each video from the plurality of videos is identified as being related to the video game in response to determining that at least a subset of the plurality of videos are included in the playlist of videos classified as associated with the video game;

selecting, for each of a plurality of categories, from the plurality of videos, a first subset of videos that includes one or more videos relevant to that category, wherein one of the plurality of categories includes videos that are currently being live streamed in which a user is playing the video game;

selecting from the plurality of videos, a second subset of popular videos that includes one or more videos based on popularity of each of the plurality of videos, wherein the popularity of each of the plurality of videos corresponds to a number of requesting users that provided an indication of enjoying that video;

receiving a request from a user device to present a user interface including representations of videos related to the video game;

determining videos that are relevant to the user device from which the request was received based on user subscription information for a user associated with the user device, wherein the user subscription information indicates that the user has subscribed to a plurality of channels on which each of the relevant videos has been uploaded, wherein each of the plurality of channels contains a collection of user-selected video content associated with other users of the video sharing platform;

in response to receiving the request to present the user interface, selecting a third subset of videos that includes one or more of the videos based on the user subscription information;

causing the user device to present the user interface having a plurality of portions including at least a first portion that includes representations of videos relevant to a first of the plurality of categories that includes videos that are currently being live streamed in which users are playing the video game from the first subset of videos, a second portion that includes representations of videos selected based on popularity from the second subset of videos, and a third portion that includes representations of videos selected based on the user subscription information from the third subset of videos, wherein the user interface allows a user of the user device to select user interface elements to switch between the first portion, the second portion, and the third portion;

receiving a request to present a video selected via the user interface; and causing the user device to present the requested video.

16. The non-transitory computer-readable medium of claim 15, wherein the plurality of categories includes at least one of the following categories: videos that include a review of the video game; and videos uploaded by a publisher of the game.

17. The non-transitory computer-readable medium of claim 15, wherein the interface includes metadata related to the video game including a title of the game and one or more images related to the video game.

18. The non-transitory computer-readable medium of claim 15, wherein the user interface includes a fourth portion that includes videos relevant to a second of the plurality of categories, and wherein the user interface includes a plurality of user interface elements each corresponding to one of the plurality of portions such that selection of the user interface element corresponding to a particular portion causes representations of videos included in that portion to be presented via the user interface.

19. The non-transitory computer-readable medium of claim 18, wherein the user interface includes a fifth portion that includes representations of at least one video from each of the first through fourth portions.

20. The non-transitory computer-readable medium of claim 19, wherein the plurality of user interface elements are presented as tabs over an area of the user interface in which representations of videos from a selected tab are presented.

21. The non-transitory computer-readable medium of claim 18, wherein each video presented in the first portion that is associated with a category of the plurality of categories is presented in association with an icon identifying the category associated with that video.

* * * * *